(12) United States Patent
Moreno Patan (10) Patent No.: US 12,005,377 B2
(45) Date of Patent: Jun. 11, 2024

(54) FUEL OXYGEN REDUCTION UNIT WITH LEVEL CONTROL DEVICE

(71) Applicant: General Electric Company, Schenectady, NY (US)

(72) Inventor: Victor Moreno Patan, Queretaro (MX)

(73) Assignee: General Electric Company, Schenectady, NY (US)

(*) Notice: Subject to any disclaimer, the term of this patent is extended or adjusted under 35 U.S.C. 154(b) by 1 day.

(21) Appl. No.: 17/347,636

(22) Filed: Jun. 15, 2021

(65) Prior Publication Data
US 2022/0397066 A1    Dec. 15, 2022

(51) Int. Cl.
*B01D 19/00*   (2006.01)

(52) U.S. Cl.
CPC .................................. *B01D 19/00* (2013.01)

(58) Field of Classification Search
CPC ......... B64D 37/34; F02M 37/22; F02C 7/232; F02C 7/22; B60K 3/04
See application file for complete search history.

(56) References Cited

U.S. PATENT DOCUMENTS

| | | |
|---|---|---|
| 2,064,962 A | 12/1936 | Waters |
| 2,582,842 A | 1/1952 | Messinger |
| 2,720,313 A | 10/1955 | Pattison |
| 2,893,628 A | 7/1959 | Herman |
| 3,050,240 A | 8/1962 | Darnell |
| 3,178,105 A | 4/1965 | Darnell |
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,264,844 A | 4/1981 | Axe et al. |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |

(Continued)

FOREIGN PATENT DOCUMENTS

| | | |
|---|---|---|
| CN | 1644892 A | 7/2005 |
| CN | 1899661 A | 1/2007 |

(Continued)

OTHER PUBLICATIONS

Kelburn Engineering, Landfill, Sewage, Biogas, Coal, Seam & Mines Gas Separation/Filtration, LandfillGas and Air Separation, 3 pages. www.kelburneng.com.uk//landfill-gas-bio-gas-sewer-gas.php.

*Primary Examiner* — Youngsul Jeong
(74) *Attorney, Agent, or Firm* — Dority & Manning, P.A.

(57) ABSTRACT

A fuel oxygen reduction unit for an engine is provided. The fuel oxygen reduction unit includes a contactor including a fuel inlet that receives an inlet fuel flow and a stripping gas inlet that receives an inlet stripping gas flow, the contactor configured to form a fuel/gas mixture; a separator that receives the fuel/gas mixture, the fuel oxygen reduction unit defining a circulation gas flowpath from the separator to the contactor; and a level control device that controls a level of the fuel/gas mixture inside the separator by regulating the inlet fuel flow to the contactor.

18 Claims, 6 Drawing Sheets

(56) References Cited

U.S. PATENT DOCUMENTS

| | | |
|---|---|---|
| 4,714,139 A | 12/1987 | Lorenz et al. |
| 4,715,398 A | 12/1987 | Shouldice et al. |
| 4,738,779 A | 4/1988 | Carroll et al. |
| 4,755,197 A | 7/1988 | Benson et al. |
| 4,773,212 A | 9/1988 | Griffin et al. |
| 5,035,346 A | 7/1991 | Kalman |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,174,219 B1 * | 1/2001 | Mathews ............ B24B 15/04 451/6 |
| 6,182,435 B1 | 2/2001 | Niggemann et al. |
| 6,250,097 B1 | 6/2001 | Lui et al. |
| 6,294,091 B1 | 9/2001 | Hoff |
| 6,315,815 B1 * | 11/2001 | Spadaccini ............ B01D 61/00 96/6 |
| 6,415,595 B1 | 7/2002 | Wilmot, Jr. et al. |
| 6,423,124 B1 | 7/2002 | Cattani |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,537,644 B2 | 5/2009 | Park et al. |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-Wlam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 * | 6/2017 | Johnson ............ B01D 53/047 |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams et al. |
| 9,885,290 B2 | 2/2018 | Della-Fera et al. |
| 9,897,054 B2 | 2/2018 | Lo et al. |
| 2007/0006591 A1 | 1/2007 | Spadaccini et al. |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0059377 A1 | 3/2011 | Scotto et al. |
| 2011/0262309 A1 | 10/2011 | Limaye et al. |
| 2012/0012782 A1 | 1/2012 | Scotto et al. |
| 2012/0012783 A1 | 1/2012 | Scotto |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2015/0375868 A1 | 12/2015 | Smith et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1 * | 6/2016 | Lo ............ B64D 37/34 96/187 |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0356224 A1 | 12/2016 | Farnum et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0291714 A1 | 10/2017 | Corman |
| 2017/0321607 A1 | 11/2017 | Sweeney et al. |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2019/0153952 A1 | 5/2019 | Niergarth et al. |
| 2019/0153953 A1 | 5/2019 | Niergarth et al. |
| 2020/0086239 A1 | 3/2020 | Cordatos et al. |
| 2020/0141337 A1 | 5/2020 | O'Connor et al. |

FOREIGN PATENT DOCUMENTS

| | | |
|---|---|---|
| CN | 1927658 A | 3/2007 |
| EP | 2003311 A2 | 12/2008 |
| EP | 3018304 A1 | 5/2016 |
| EP | 3075957 A1 | 10/2016 |
| GB | 1485095 A | 9/1977 |
| GB | 2136880 A | 9/1984 |
| GB | 2204361 A | 11/1988 |
| JP | S5932893 U | 2/1984 |

(56) References Cited

FOREIGN PATENT DOCUMENTS

| WO | WO 02/16743 A1 | 2/2002 |
|----|----|----|
| WO | WO02/038938 A1 | 5/2002 |
| WO | WO2006/079438 A1 | 8/2006 |
| WO | WO2011/038188 A1 | 3/2011 |

* cited by examiner

FUEL OXYGEN REDUCTION UNIT WITH LEVEL CONTROL DEVICE

TECHNICAL FIELD

The present subject matter relates generally to a fuel oxygen reduction unit for an engine and a method of operating the same.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount.

BRIEF DESCRIPTION

Aspects and advantages of the disclosure will be set forth in part in the following description, or may be obvious from the description, or may be learned through practice of the disclosure.

In one exemplary embodiment of the present disclosure, a fuel oxygen reduction unit for an engine is provided. The fuel oxygen reduction unit includes a contactor including a fuel inlet that receives an inlet fuel flow and a stripping gas inlet that receives an inlet stripping gas flow, the contactor configured to form a fuel/gas mixture; a separator that receives the fuel/gas mixture, the fuel oxygen reduction unit defining a circulation gas flowpath from the separator to the contactor; and a level control device that controls a level of the fuel/gas mixture inside the separator by regulating the inlet fuel flow to the contactor.

In an exemplary aspect of the present disclosure, a method is provided for operating a fuel delivery system for an engine. The method includes receiving an inlet fuel flow in a contactor of a fuel oxygen reduction unit for reducing an amount of oxygen in the inlet fuel flow using a stripping gas flow through a stripping gas flowpath; separating a fuel/gas mixture into an outlet stripping gas flow and an outlet fuel flow via a separator; and controlling a level of the fuel/gas mixture inside the separator by regulating the inlet fuel flow to the contactor.

In another exemplary embodiment of the present disclosure, a leveling system for a fuel oxygen reduction unit having a contactor including a fuel inlet that receives an inlet fuel flow and a stripping gas inlet that receives an inlet stripping gas flow, and a separator that receives a fuel/gas mixture from the contactor is provided. The leveling system includes a level control device configured to be positioned in fluid communication with a fuel flowpath to the contactor, the level control device comprising a spool movably disposed within the level control device configured to control a level of the fuel/gas mixture inside the separator by regulating the inlet fuel flow to the contactor.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the various embodiments.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A fuel oxygen reduction unit of the present disclosure includes a level control device that controls a level of a fuel/gas mixture inside a separator by regulating an inlet fuel flow that is provided to a contactor. In exemplary embodiments, the level control device of the present disclosure utilizes an active liquid or fuel level inside the separator, e.g., a pressure of the fuel or liquid within the separator, to regulate an inlet fuel flow. For example, the level control device in at least one embodiment utilizes a first reference pressure in a center of the separator and a second reference pressure at an edge of the separator to regulate an inlet fuel flow. A self-regulating level control device of the present disclosure ensures a continuous availability of an adequate amount of fuel within the separator and to a downstream system. In this manner, the level control device also prevents an overflow of the fuel or liquid inside of the separator. The connection to a reference pressure can be direct or indirect to improve the responsiveness of the system. A level control device of the present disclosure may be fully self-contained and may not require any external components or external control for the system to work.

In a fuel oxygen reduction system, the mixing of a stripping gas with a liquid fuel results in a foamy composition that may cause a loss of continuity with the amount of fuel an engine pulls in. This may cause an inlet fuel flow that is providing too much fuel or too little fuel to the system thereby resulting in either overflowing a separator with fuel or a separator that is fuel starved. The level control device of the present disclosure eliminates these problems and ensures a more continuous availability of an adequate amount of fuel within the separator and to a downstream system.

Figure 1:
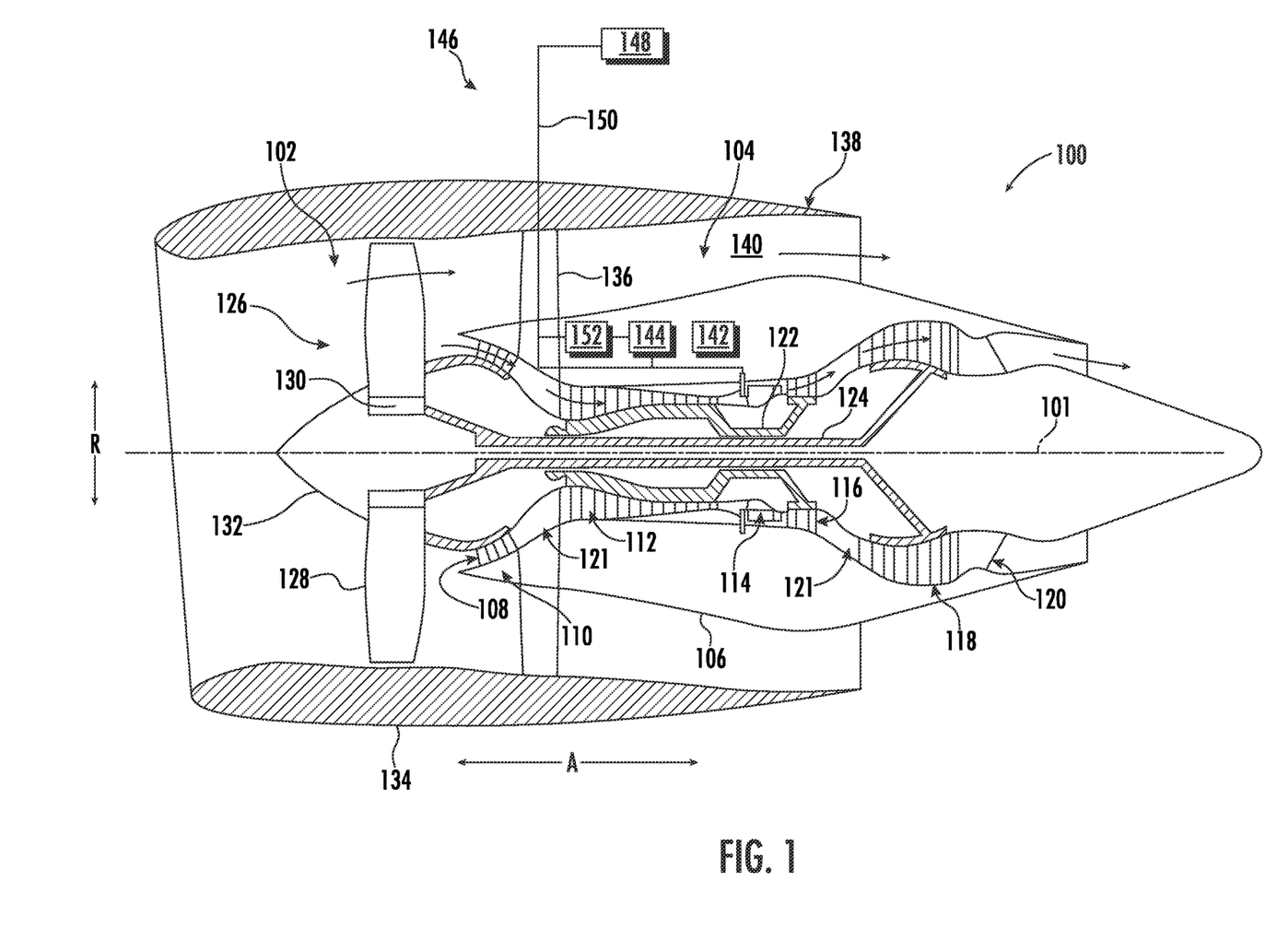
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft.

For the embodiment depicted, the engine is configured as a high bypass turbofan engine 100. As shown in FIG. 1, the turbofan engine 100 defines an axial direction A (extending parallel to a longitudinal centerline or axis 101 provided for reference), a radial direction R, and a circumferential direction (extending about the axial direction A; not depicted in FIG. 1). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet exhaust nozzle section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 101 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The outer nacelle 134 is supported relative to the turbomachine 104 by a plurality of circumferentially-spaced outlet guide vanes 136. A downstream section 138 of the outer nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen reduction unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Notably, as used herein, the term "fuel oxygen reduction" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the fuel oxygen reduction unit 144 positioned within the turbomachine 104, i.e., within the casing 106 of the turbomachine 104, in other embodiments, the fuel oxygen reduction unit 144 may be positioned at any other suitable location. For example, in other embodiments, the fuel oxygen reduction unit 144 may instead be positioned remote from the turbofan engine 100. Additionally, in other embodiments, the fuel oxygen reduction unit 144 may additionally or alternatively be driven by other suitable power sources such as an electric motor, a hydraulic motor, or an independent mechanical coupling to the HP or LP shaft, etc.

Figure 2:
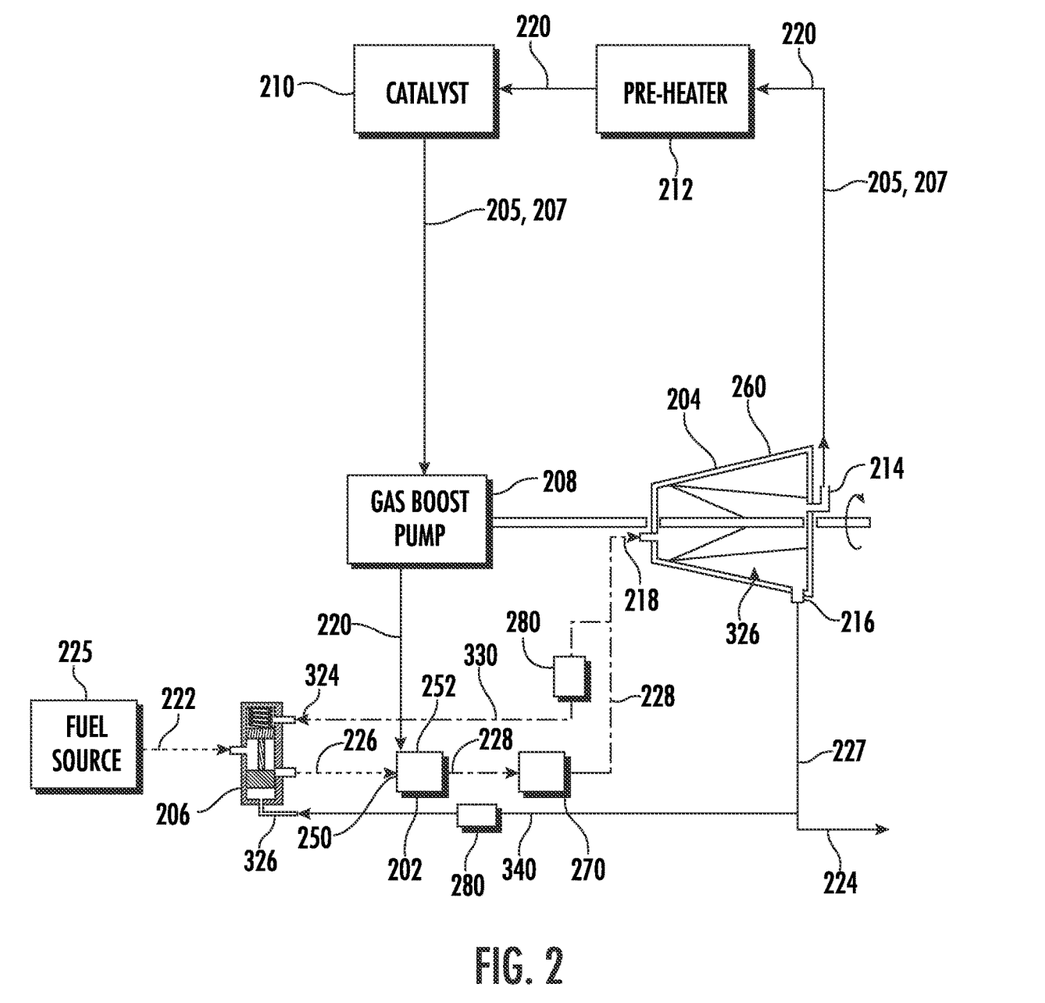
FIG. 2 is a schematic view of a fuel oxygen reduction unit with a level control device in accordance with an exemplary embodiment of the present disclosure.

Referring now to FIG. 2, schematic drawings of a fuel oxygen reduction unit or oxygen transfer assembly 200 for a gas turbine engine in accordance with an exemplary aspect of the present disclosure is provided. In at least certain exemplary embodiments, the exemplary fuel oxygen reduction unit 200 depicted may be incorporated into, e.g., the exemplary turbofan engine 100 described above with reference to FIG. 1 (e.g., may be the fuel oxygen reduction unit 144 depicted in FIG. 1 and described above).

Figure 5:
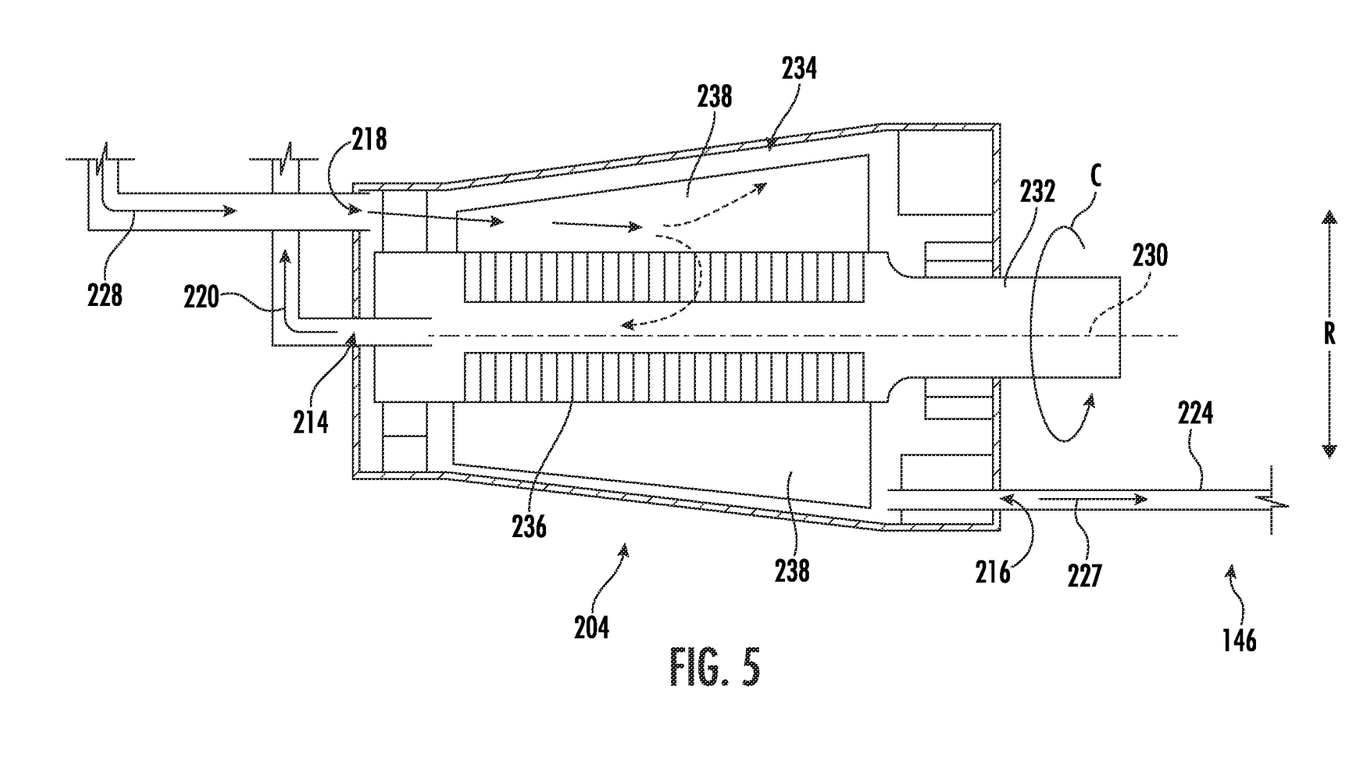
FIG. 5 is a schematic view of a separator of a fuel oxygen reduction unit in accordance with an exemplary embodiment of the present disclosure.

As will be appreciated from the discussion herein, in an exemplary embodiment, the fuel oxygen reduction unit 200 generally includes a contactor 202, a separator 204, and a level control device 206. In an exemplary embodiment, the separator 204 may be a dual separator pump as described in more detail below and as shown in FIG. 5. In other exemplary embodiments, other separators may be utilized with the fuel oxygen reduction unit 200 of the present disclosure.

In some exemplary embodiments, the fuel oxygen reduction unit 200 may also include a gas boost pump 208, a catalyst 210, and a pre-heater 212. Moreover, the exemplary fuel oxygen reduction unit 200 generally defines a circulation gas flowpath 205 from the separator 204 to the contactor 202, with, for the embodiment depicted in FIG. 2, the pre-heater 212, the catalyst 210, and the gas boost pump 208 being positioned within or otherwise fluidly connected to the circulation gas flowpath 205.

In exemplary embodiments, the contactor 202 may be configured in any suitable manner to substantially mix a received gas and liquid flow. For example, the contactor 202 may, in certain embodiments, be a mechanically driven contactor (e.g., having paddles for mixing the received flows), or alternatively may be a passive contactor for mixing the received flows using, at least in part, a pressure and/or flowrate of the received flows. For example, a passive contactor may include one or more turbulators, a venturi mixer, etc.

In an exemplary embodiment, the contactor 202 includes a contactor fuel inlet 250 that receives an inlet fuel flow 226 and a contactor stripping gas inlet 252 that receives a stripping gas flow 220. As described herein, the contactor 202 is configured to form a fuel/gas mixture 228.

Moreover, the exemplary fuel oxygen reduction unit 200 includes a stripping gas line 207, and more particularly, includes a plurality of stripping gas lines 207, which together at least in part define a circulation gas flowpath 205 extending from the separator 204 to the contactor 202. In certain exemplary embodiments, the circulation gas flowpath 205 may be formed of any combination of one or more conduits, tubes, pipes, etc. in addition to the plurality of stripping gas lines 207 and structures or components within the circulation gas flowpath 205.

It will be appreciated that the fuel oxygen reduction unit 200 generally provides for the flow of stripping gas 220 through the plurality of stripping gas lines 207 and the gas flowpath 205 during operation. It will be appreciated that the term "stripping gas" is used herein as a term of convenience to refer to a gas generally capable of performing the functions described herein. The stripping gas 220 flowing through the stripping gas flowpath/circulation gas flowpath 205 may be an actual stripping gas functioning to strip oxygen from the fuel within the contactor, or alternatively may be a sparging gas bubbled through a liquid fuel to reduce an oxygen content of such fuel. For example, the stripping gas 220 may be an inert gas, such as Nitrogen or Carbon Dioxide (CO2), a gas mixture made up of at least 50% by mass inert gas, or some other gas or gas mixture having a relatively low oxygen content.

For the embodiment shown, the gas boost pump 208, the catalyst 210, and the pre-heater 212 are each arranged within the circulation gas flowpath 205 in series flow. Additionally, the gas boost pump 208 is configured as a rotary gas pump mechanically coupled to, and driven by the fuel gas separator 204. In such a manner, the gas boost pump 208 is rotatable with fuel gas separator 204. However, in other embodiments, the gas boost pump 208 may be configured in any other suitable manner. For example, in other embodiments, the gas boost pump 208 may be mechanically disconnected from, and independently rotatable relative to, the fuel gas separator 204. For example, in certain embodiments, the gas boost pump 208 and/or separator 204 may be independently coupled to an accessory gearbox, or may be an electric pump electrically coupled to a suitable electrical power source, such as a permanent magnet alternator (PMA) that may also serve to provide power to a full authority digital control engine controller (FADEC). In an embodiment where the gas boost pump 208 is coupled to a power source independent of the separator 204, the gas boost pump 208 may rotate at a different rotational speed than the fuel gas separator 204.

Referring still to FIG. 2, in an exemplary embodiment, the separator 204 generally includes a stripping gas outlet 214, a fuel outlet 216, and an inlet 218. It will also be appreciated that the exemplary fuel oxygen reduction unit 200 depicted is operable with a fuel delivery system 146, such as a fuel delivery system 146 of the gas turbine engine including the fuel oxygen reduction unit 200 (see, e.g., FIG. 1). The exemplary fuel delivery system 146 generally includes a plurality of fuel lines, and in particular, an inlet fuel line 222 and an outlet fuel line 224. The inlet fuel line 222 is fluidly connected to the contactor 202, via the level control device 206, for providing a flow of liquid fuel or inlet fuel flow 226 to the contactor 202 (e.g., from a fuel source 225, such as a fuel tank) and the outlet fuel line 224 is fluidly connected to the fuel outlet 216 of the separator 204 for receiving a flow of deoxygenated liquid fuel or outlet fuel flow 227.

Moreover, during typical operations, a flow of stripping gas 220 flows through the circulation gas flowpath 205 from the stripping gas outlet 214 of the separator 204 to the contactor 202. More specifically, during typical operations, stripping gas 220 flows from the stripping gas outlet 214 of the separator 204, through the pre-heater 212 (configured to add heat energy to the gas flowing therethrough), through the catalyst 210, and to/through the gas boost pump 208, wherein a pressure of the stripping gas 220 is increased to provide for the flow of the stripping gas 220 through the circulation gas flowpath 205. The relatively high pressure stripping gas 220 (i.e., relative to a pressure upstream of the boost pump 208 and the fuel entering the contactor 202) is then provided to the contactor 202, wherein the stripping gas 220 is mixed with the flow of inlet fuel 226 from the inlet fuel line 222 to generate a fuel/gas mixture 228. The fuel/gas mixture 228 generated within the contactor 202 is provided to the inlet 218 of the separator 204.

Generally, it will be appreciated that during operation of the fuel oxygen reduction unit 200, the inlet fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the inlet fuel 226 is mixed with the stripping gas 220, resulting in the fuel/gas mixture 228. As a result of such mixing a physical exchange may occur whereby at least a portion of the oxygen within the inlet fuel 226 is transferred to the stripping gas 220, such that the fuel component of the mixture 228 has a relatively low oxygen content (as compared to the inlet fuel 226 provided through inlet fuel line 222) and the stripping gas component of the mixture 228 has a relatively high oxygen content (as compared to the inlet stripping gas 220 provided through the circulation gas flowpath 205 to the contactor 202).

Within the separator 204 the relatively high oxygen content stripping gas 220 is then separated from the relatively low oxygen content fuel back into respective flows of an outlet stripping gas 220 and outlet fuel 227.

In one exemplary embodiment, the separator 204 may be a dual separator pump as shown in FIG. 5. For example, referring briefly to FIG. 5, a dual separator pump such as separator 204 defines a central axis 230, radial direction R, and a circumferential direction C extending about the central axis 230. Additionally, a dual separator pump, e.g., separator 204, is configured as a mechanically-driven dual separator pump, or more specifically as a rotary/centrifugal dual separator pump. Accordingly, a dual separator pump, e.g., separator 204, includes an input shaft 232 and a single-stage separator/pump assembly 234. The input shaft 232 is mechanically coupled to the single-stage separator/pump assembly 234, and the two components are together rotatable about the central axis 230. Further, the input shaft 232 may be mechanically coupled to, and driven by, e.g., an accessory gearbox (such as the exemplary accessory gearbox 142 of FIG. 1). However, in other embodiments, the input shaft 232 may be mechanically coupled to any other suitable power source, such as an electric, hydraulic, pneumatic, or other power source. As will be appreciated, the single-stage separator/pump assembly 234 may simultaneously separate the mixture 228 into flows of an outlet stripping gas 220 and outlet fuel 227 from the mixture 228 and increase a pressure of the separated outlet fuel 227 (as will be discussed in greater detail below).

Additionally, the exemplary single-stage separator/pump assembly 234 depicted generally includes an inner gas filter 236 arranged along the central axis 230, and a plurality of paddles 238 positioned outward of the inner gas filter 236 along the radial direction R. During operation, a rotation of the single-stage separator/pump assembly 234 about the central axis 230, and more specifically, a rotation of the plurality of paddles 238 about the central axis 230 (i.e., in the circumferential direction C), may generally force the heavier liquid fuel 226 outward along the radial direction R and lighter stripping gas 220 inward along the radial direction R through the inner gas filter 236. In such a manner, the outlet fuel 227 may exit through the fuel outlet 216 of a dual separator pump, e.g., separator 204, and the outlet stripping gas 220 may exit through the stripping gas outlet 214 of a dual separator pump, e.g., separator 204, as is indicated.

Further, it will be appreciated that with such a configuration, the outlet fuel 227 exiting a dual separator pump, e.g., separator 204, through the fuel outlet 216 may be at a higher pressure than the inlet fuel 226 provided through inlet fuel line 222, and further higher than the fuel/gas mixture 228 provided through the inlet 218. Such may be due at least in part to the centrifugal force exerted on the inlet fuel flow 226 and the rotation of the plurality of paddles 238. Additionally, it will be appreciated that for the embodiment depicted, the liquid fuel outlet 216 is positioned outward of the inlet 218 (i.e., the fuel gas mixture inlet) along the radial direction R. Such may also assist with the increasing of the pressure of the outlet fuel 227 provided through the fuel outlet 216 of the separator 204.

For example, it will be appreciated that with such an exemplary embodiment, the separator 204 of the fuel oxygen reduction unit 200 may generate a pressure rise in the fuel flow during operation. As used herein, the term "pressure rise" refers to a net pressure differential between a pressure of the flow of outlet fuel 227 provided to the fuel outlet 216 of the separator 204 (i.e., a "liquid fuel outlet pressure") and a pressure of the inlet fuel 226 provided through the inlet fuel line 222 to the contactor 202. In at least certain exemplary embodiments, the pressure rise of the inlet fuel 226 may be at least about sixty (60) pounds per square inch ("psi"), such as at least about ninety (90) psi, such as at least about one hundred (100) psi, such as up to about seven hundred and fifty (750) psi. With such a configuration, it will be appreciated that in at least certain exemplary embodiments of the present disclosure, the liquid fuel outlet pressure may be at least about seventy (70) psi during operation. For example, in at least certain exemplary embodiments, the liquid fuel out of pressure may be at least about one hundred (100) psi during operation, such as at least about one hundred and twenty-five (125) psi during operation, such as up to about eight hundred (800) psi during operation.

Further, it will be appreciated that the outlet fuel 227 provided to the fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the outlet fuel 227 provided to the fuel outlet 216 may have an oxygen content of less than about five (5) parts per million ("ppm"), such as less than about three (3) ppm, such as less than about two (2) ppm, such as less than about one (1) ppm, such as less than about 0.5 ppm.

Moreover, referring now back to FIG. 2, as will be appreciated, the exemplary fuel oxygen reduction unit 200 depicted recirculates and reuses the stripping gas 220 (i.e., the stripping gas 220 operates in a substantially closed loop). However, the stripping gas 220 exiting the separator 204, having interacted with the inlet fuel 226, has a relatively high oxygen content. Accordingly, in order to reuse the stripping gas 220, an oxygen content of the stripping gas 220 from the stripping gas outlet 214 of the separator 204 needs to be reduced. For the embodiment depicted, and as noted above, the stripping gas 220 flows through the pre-heater 212, through the catalyst 210 where the oxygen content of the stripping gas 220 is reduced, and through the gas boost pump 208 where a pressure of the stripping gas 220 is increased to provide for the flow of the stripping gas 220 through the circulation gas flowpath 205.

More specifically, within the catalyst 210 the relatively oxygen-rich stripping gas 220 is reacted to reduce the oxygen content thereof. It will be appreciated that catalyst 210 may be configured in any suitable manner to perform such functions. For example, in certain embodiments, the catalyst 210 may be configured to combust the relatively oxygen-rich stripping gas 220 to reduce an oxygen content thereof. However, in other embodiments, the catalyst 210 may additionally, or alternatively, include geometries of catalytic components through which the relatively oxygen-rich stripping gas 220 flows to reduce an oxygen content thereof. In one or more of these embodiments, the catalyst 210 may be configured to reduce an oxygen content of the stripping gas 220 to less than about five percent (5%) oxygen ($O_2$) by mass, such less than about two (2) percent (3%) oxygen ($O_2$) by mass, such less than about one percent (1%) oxygen ($O_2$) by mass.

The resulting relatively low oxygen content gas is then provided through the remainder of the circulation gas flowpath 205 and back to the contactor 202, such that the cycle may be repeated. In such a manner, it will be appreciated that the stripping gas 220 may be any suitable gas capable of undergoing the chemical transitions described above. For example, the stripping gas may be air from, e.g., a core air flowpath of a gas turbine engine including the fuel oxygen reduction unit 200 (e.g., compressed air bled from an HP compressor 112; see FIG. 1).

However, in other embodiments, the stripping gas may instead be any other suitable gas, such as an inert gas, such as Nitrogen or Carbon Dioxide ($CO_2$), a gas mixture made up of at least 50% by mass inert gas, or some other gas or gas mixture having a relatively low oxygen content.

It will be appreciated, however, that the exemplary fuel oxygen reduction unit 200 described above is provided by way of example only. In other embodiments, the fuel oxygen reduction unit 200 may be configured in any other suitable manner. For example, in other embodiments, the fuel oxygen reduction unit 200 may have any other suitable separator 204, may have its components arranged in any other suitable flow order, may not include each of the components depicted, may include components configured in any other suitable manner, or may include other components not depicted or described herein.

In other embodiments, the stripping gas 220 may not flow through a circulation gas flowpath 205, and instead the fuel oxygen reduction unit 200 may include an open loop stripping gas flowpath, with such flowpath in flow communication with a suitable stripping gas source, such as a bleed air source, and configured to dump such air to the atmosphere downstream of the fuel gas separator 204.

Figure 3:
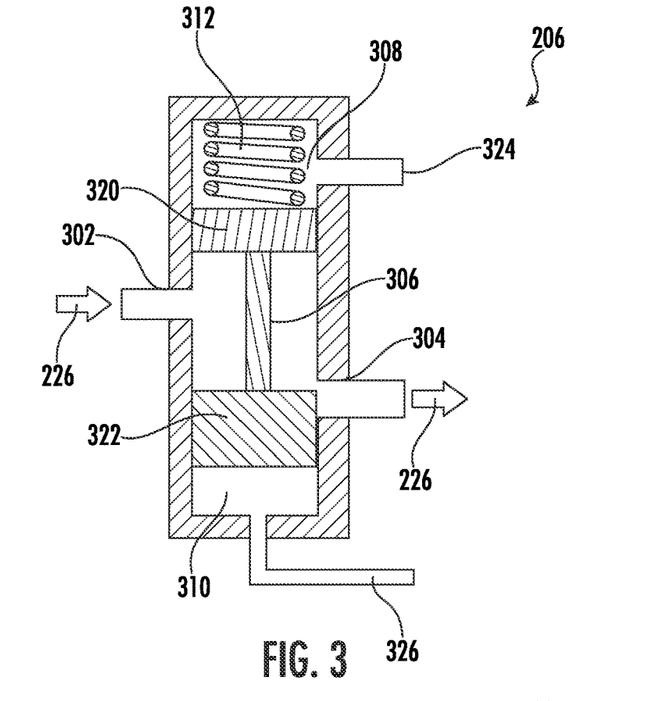
FIG. 3 is a schematic view of a level control device in accordance with an exemplary embodiment of the present disclosure.

Referring still to FIG. 2 and now also to FIG. 3, the fuel oxygen reduction unit 200 also includes a level control device 206 that controls a level of the fuel/gas mixture 228 inside a separator 204 by regulating the inlet fuel flow 226 that is provided to the contactor 202.

In exemplary embodiments, the level control device 206 utilizes an active liquid or fuel level inside the separator 204, e.g., a pressure of the fuel or liquid within the separator 204, to regulate an inlet fuel flow. For example, the level control device 206 utilizes a reference pressure in a center of the separator 204 and a second reference pressure at an edge of the separator 204 to regulate an inlet fuel flow. A self-regulating level control device 206 of the present disclosure may ensure a continuous availability of an adequate amount of fuel within the separator 204 and to a downstream system. In this manner, the level control device 206 may also prevent an overflow of the fuel or liquid inside of the separator 204.

The connection to a reference pressure can be direct or indirect to improve the responsiveness of the system. A level control device 206 of the present disclosure is fully self-contained and does not require any external components or external control for the system to work.

In a fuel oxygen reduction system, the mixing of an inert gas with a liquid fuel results in a foamy composition that may cause a loss of continuity with the amount of fuel an engine pulls in. This may cause an inlet fuel flow that is providing too much fuel or too little fuel to the system thereby resulting in either overflowing a separator with fuel or a separator that is fuel starved. The level control device 206 of the present disclosure eliminates these problems and ensures a continuous availability of an adequate amount of fuel within the separator 204 and to a downstream system.

In an exemplary embodiment, the level control device 206 is disposed upstream of the contactor 202 and controls the amount of the inlet fuel flow 226 provided to the contactor 202. In an exemplary embodiment, the level control device 206 generally includes a control device fuel inlet 302, a control device fuel outlet 304, a spool 306, a fuel/gas mixture pressure reference portion 308, a separator edge pressure reference portion 310, and a spring 312 (see, particularly FIG. 3).

Referring still to FIGS. 2 and 3, in an exemplary embodiment, the control device fuel inlet 302 is in communication with a fuel source 225 and the control device fuel outlet 304 is in communication with the contactor fuel inlet 250 of the contactor 202. As is depicted more clearly in FIG. 3, the spool 306 includes a first spool end 320 and a second spool end 322. The spool 306 is movably disposed within the level control device 206 such that the spool 306 is able to transition between positions to control the amount of inlet fuel flow 226 that exits the control device fuel outlet 304.

The level control device 206 includes the fuel/gas mixture pressure reference portion 308 that is in communication with a fuel/gas mixture pressure 324, e.g., a reference pressure in a central portion of the separator 204, and the first spool end 320. In an exemplary embodiment, it is contemplated that a central portion of the separator 204 includes a portion that is in the middle 50% of the separator 204, e.g., between the inlet 218 and the fuel outlet 216. In other exemplary embodiments, it is contemplated that a central portion of the separator 204 may include a portion that is in the middle 25% of the separator 204, e.g., between the inlet 218 and the fuel outlet 216. In an exemplary embodiment, it is contemplated that a central portion of the separator 204 may include a portion that is in the middle 50% of the separator 204, e.g., based on a diameter of the separator 204 relative to a centerline of the separator 204. In other exemplary embodiments, it is contemplated that a central portion of the separator 204 may include a portion that is in the middle 25% of the separator 204, e.g., based on a diameter of the separator 204 relative to a centerline of the separator 204.

The level control device 206 also includes the separator edge pressure reference portion 310 that is in communication with a separator edge pressure 326 and the second spool end 322. Referring to FIG. 3, in an exemplary embodiment, the spring 312 is in communication with the first spool end 320.

The separator edge pressure 326 refers to a pressure of the fluid at an outer edge of an interior of the separator 204, as pointed to by the separator edge pressure arrow 326 in FIG. 2. The separator edge pressure 326 is communicated to the level control device 206 via the separator edge pressure conduit labeled 326 in FIG. 3, and is referred to herein as reference numeral 326 for convenience.

Referring back particularly to FIG. 2, the fuel/gas mixture pressure 324 is in communication with the fuel/gas mixture pressure reference portion 308 of the level control device 206 via a fuel/gas mixture pressure supply loop 330. In this manner, a fuel/gas mixture pressure 324 of the fuel/gas mixture 228 downstream of the contactor 202 is used to operate the level control device 206 as described herein.

The fuel/gas mixture pressure 324 refers to a pressure of the fuel/gas mixture 228 downstream of the contactor 202, as pointed to by the fuel/gas mixture pressure arrow 324 in FIG. 2. The fuel/gas mixture pressure 324 is communicated to the level control device 206 via the fuel/gas mixture pressure conduit labeled 324 in FIG. 3, and is referred to herein as reference numeral 324 for convenience.

The separator edge pressure 326 is a pressure of the liquid within the separator 204 and at the separator edge 260. As the separator 204 is spinning very fast, the centrifugal forces of the separator 204 create a higher pressure in these edge regions. For example, the separator edge pressure 326 is a higher pressure than a pressure of the inlet fuel flow 226.

The separator edge pressure 326 is in communication with the separator edge pressure reference portion 310 of the level control device 206 (see FIG. 3) via a separator edge pressure supply loop 340. In this manner, a separator edge pressure 326 within the separator 204 is used to operate the level control device 206 as described herein.

Referring again also to FIG. 3, in operation, with the separator edge pressure 326 increasing, the spool 306 is moved to compress the spring 312 and close a portion of the control device fuel outlet 304 thereby reducing the amount of the inlet fuel flow 226 to the contactor 202. For example, with the separator edge pressure 326 increasing, this higher pressure exerts a force on the second spool end 322 which moves the spool 306 towards the spring 312 thereby compressing the spring 312. As the spool 306 moves towards the spring 312, a portion of the second spool end 322 also moves to block a portion of the control device fuel outlet 304 thereby decreasing the amount of the inlet fuel flow 226 that can exit the control device fuel outlet 304. The higher the separator edge pressure 326 increases, the more the spool 306 compresses the spring 312 and the more the second spool end 322 blocks the control device fuel outlet 304.

An increase in the fuel/gas mixture 228 received by the separator 204 causes an increase in the separator edge pressure 326. In this manner, the increase in the separator edge pressure 326 causes the second spool end 322 to block a portion of the control device fuel outlet 304 as described herein, thereby reducing the amount of the inlet fuel flow 226 to the contactor 202. This results in the amount of fuel/gas mixture 228 into the separator 204 to be reduced and balanced out.

In operation, with the separator edge pressure 326 decreasing, the spring 312 exerts a force on the spool 306 and the spool 306 is moved to open a portion of the control device fuel outlet 304 thereby increasing the amount of the inlet fuel flow 226 to the contactor 202. For example, with the separator edge pressure 326 decreasing, the force that the spring 312 exerts on the first spool end 320 now overcomes the separator edge pressure 326 acting on the second spool end 322 which moves the spool 306 towards the separator edge pressure reference portion 310.

As the spool 306 moves towards the separator edge pressure reference portion 310, the second spool end 322 moves down and away from blocking a portion of the control device fuel outlet 304 thereby increasing the amount of the inlet fuel flow 226 that can exit the control device fuel outlet 304. The more the separator edge pressure 326 decreases, the farther the spring 312 moves the second spool end 322 away from blocking any portions of the control device fuel outlet 304.

A decrease in the fuel/gas mixture 228 received by the separator 204 decreases the separator edge pressure 326. In this manner, the decrease in the separator edge pressure 326 causes the spring 312 to exert a force that moves the second spool end 322 away from blocking any portions of the control device fuel outlet 304 as described herein, thereby increasing the amount of the inlet fuel flow 226 to the contactor 202. This results in the amount of fuel/gas mixture 228 into the separator 204 to be increased and balanced out.

Figure 7A:
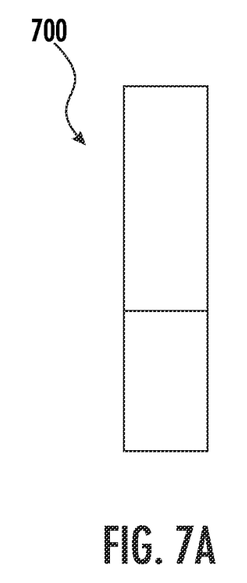
FIG. 7A is a cross-sectional view of a control device fuel outlet in accordance with an exemplary embodiment of the present disclosure.
Figure 7B:
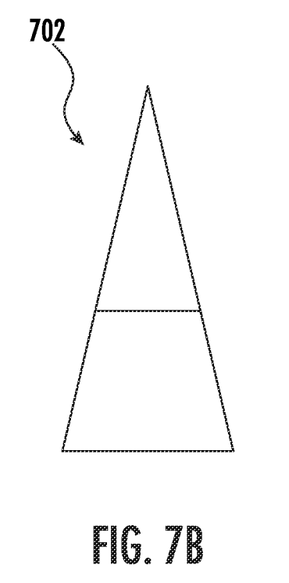
FIG. 7B is a cross-sectional view of a control device fuel outlet in accordance with another exemplary embodiment of the present disclosure.
Figure 7C:
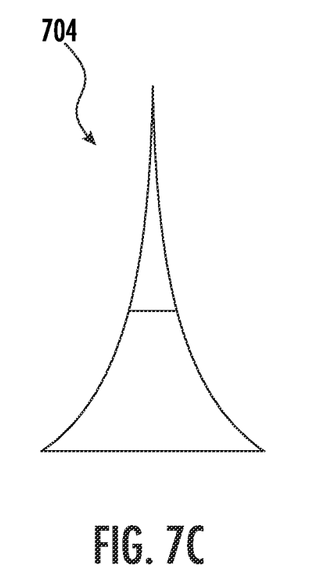
FIG. 7C is a cross-sectional view of a control device fuel outlet in accordance with another exemplary embodiment of the present disclosure.

Referring to FIGS. 7A-7C, a variety of different geometric configurations of a control device fuel outlet 304 (FIG. 3) are illustrated. For example, referring to FIG. 7A, in some exemplary embodiments, a control device fuel outlet 700 has a linear geometric shape. Referring to FIG. 7B, in another exemplary embodiment, a control device fuel outlet 702 has a triangular geometric shape. Referring to FIG. 7C, in another exemplary embodiment, a control device fuel outlet 704 has a logarithmic geometric shape.

In exemplary embodiments, the control device fuel outlet 304 may have a non-linear geometric shape. For example, in an exemplary embodiment, with a control device fuel outlet 304 having a linear geometric shape, for every 1 mm increment that the spool 306 moves down, the amount of area of the control device fuel outlet 304 that is opened is also linear. However, in some embodiments, it may be desired that for every 1 mm the spool 306 moves down, a non-linear amount of area of control device fuel outlet 304 is opening. In such embodiments, a control device fuel outlet 304 having a non-linear geometric shape allows for such non-linear opening of the control device fuel outlet 304 per increment that the spool 306 moves away from and out of contact with the control device fuel outlet 304.

In exemplary embodiments, the level control device 206 of the present disclosure ensures a continuous availability of an adequate amount of fuel within the separator 204 and to a downstream system during changing engine operating conditions, e.g., during each of an engine idle condition, an engine take-off condition, an engine high-speed condition, an engine low-speed condition, and any other desired engine conditions.

Referring back to FIG. 2, in other exemplary embodiments, the fuel oxygen reduction unit 200 may also include other components. For example, the fuel oxygen reduction unit 200 may include a removal device 270 that is located between the contactor 202 and the separator 204. In an exemplary embodiment, the removal device 270 may be used to eliminate any excess foam within the fuel/gas mixture 228. In some exemplary embodiments, the fuel oxygen reduction unit 200 may also include intermediate devices 280. For example, an intermediate device 280 may be located along a portion of the fuel/gas mixture pressure supply loop 330 and/or along a portion of the separator edge pressure supply loop 340. Such intermediate devices 280 may include sensing components and/or other monitoring devices that may be utilized to improve the sensing capabilities of the fuel oxygen reduction unit 200.

It is also contemplated that a level control device 206 of the present disclosure is compatible with a hydrogen fuel source. For example, the level control device 206 can be operated as described herein to control flow in a hydrogen fuel system.

Alternatively, the device 206 of the present disclosure may additionally or alternatively be compatible with a hydrocarbon-based fuel source.

Figure 4:
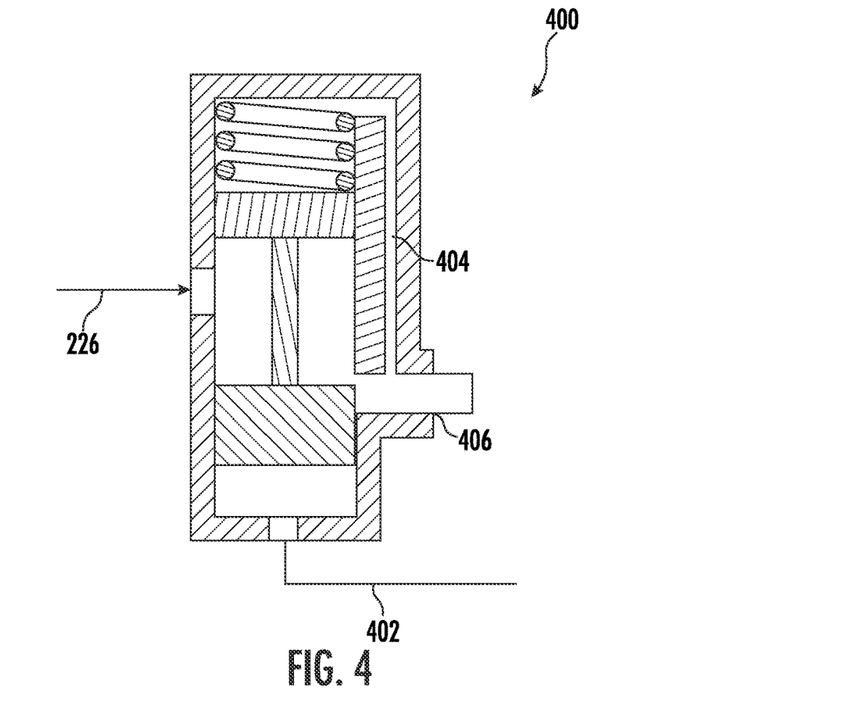
FIG. 4 is a schematic view of a level control device in accordance with another exemplary embodiment of the present disclosure.

FIG. 4 illustrates another exemplary embodiment. The embodiment of level control device 400 illustrated in FIG. 4 includes similar components to the embodiment of level control device 206 illustrated in FIGS. 2 and 3. For the sake of brevity, these similar components and the similar steps of using level control device 400 (FIG. 4) and level control device 206 (FIGS. 2 and 3) will not all be discussed in conjunction with the embodiment illustrated in FIG. 4.

Referring to FIG. 4, in other exemplary embodiments, a level control device 400 may use a first reference pressure 402 and a second reference pressure 404 to control flow as described herein. For example, in an exemplary embodiment, the first reference pressure 402 may include a separator edge pressure and the second reference pressure 404 may include a metered liquid pressure. The level control device 400 also includes a control device fuel outlet 406.

Figure 6:
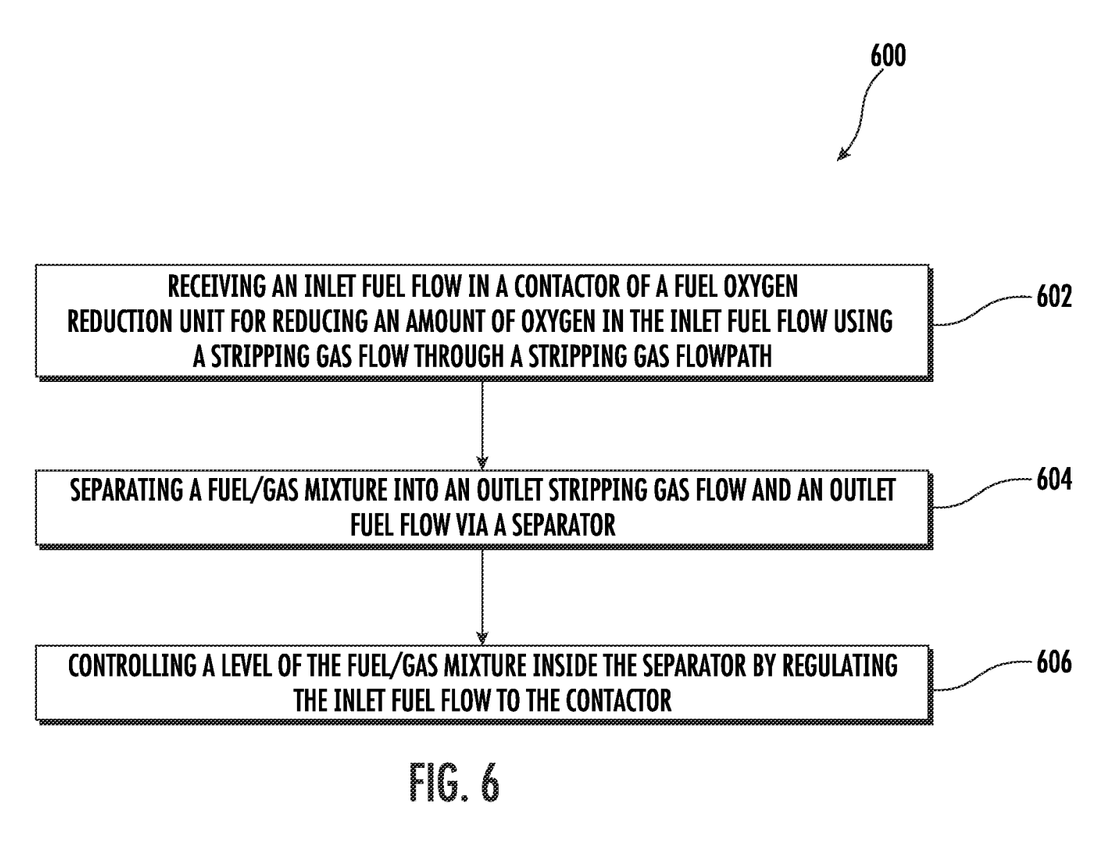
FIG. 6 is a flow diagram of a method for operating a fuel delivery system for an engine in accordance with an exemplary aspect of the present disclosure.

Referring now to FIG. 6, exemplary aspects of the present disclosure will now be discussed.

For the exemplary aspect of FIG. 6, the method 600 generally includes at (602) receiving an inlet fuel flow in a contactor of a fuel oxygen reduction unit for reducing an amount of oxygen in the inlet fuel flow using a stripping gas flow through a stripping gas flowpath as described in detail above with reference to FIGS. 1 through 5. The method 600 further includes at (604) separating a fuel/gas mixture into an outlet stripping gas flow and an outlet fuel flow via a separator and at (606) controlling a level of the fuel/gas mixture inside the separator by regulating the inlet fuel flow to the contactor as described in detail above with reference to FIGS. 1 through 5.

Further aspects of the disclosure are provided by the subject matter of the following clauses:

1. A fuel oxygen reduction unit for an engine comprising: a contactor including a fuel inlet that receives an inlet fuel flow and a stripping gas inlet that receives an inlet stripping gas flow, the contactor configured to form a fuel/gas mixture; a separator that receives the fuel/gas mixture, the fuel oxygen reduction unit defining a circulation gas flowpath from the separator to the contactor; and a level control device that controls a level of the fuel/gas mixture inside the separator by regulating the inlet fuel flow to the contactor.

2. The fuel oxygen reduction unit of any preceding clause, wherein the level control device is upstream of the contactor and controls an amount of the inlet fuel flow to the contactor.

3. The fuel oxygen reduction unit of any preceding clause, wherein the level control device comprises: a control device fuel inlet in communication with a fuel source; a control device fuel outlet in communication with the fuel inlet of the contactor; and a spool having a first spool end and a second spool end, the spool movably disposed within the level control device.

4. The fuel oxygen reduction unit of any preceding clause, wherein the level control device further comprises: a fuel/gas mixture pressure reference portion in communication with a fuel/gas mixture pressure and the first spool end; a separator edge pressure reference portion in communication with a separator edge pressure and the second spool end; and a spring in communication with the first spool end.

5. The fuel oxygen reduction unit of any preceding clause, wherein with the separator edge pressure increasing, the spool is moved to compress the spring and close a portion of the control device fuel outlet thereby reducing the amount of the inlet fuel flow to the contactor.

6. The fuel oxygen reduction unit of any preceding clause, wherein with the separator edge pressure decreasing, the spring exerts a force on the spool and the spool is moved to open a portion of the control device fuel outlet thereby increasing the amount of the inlet fuel flow to the contactor.

7. The fuel oxygen reduction unit of any preceding clause, wherein an increase in the fuel/gas mixture received by the separator increases the separator edge pressure.

8. The fuel oxygen reduction unit of any preceding clause, wherein a decrease in the fuel/gas mixture received by the separator decreases the separator edge pressure.

9. The fuel oxygen reduction unit of any preceding clause, wherein the separator includes an inlet in fluid communication with the contactor that receives the fuel/gas mixture, a fuel outlet, and a stripping gas outlet, wherein the separator is configured to separate the fuel/gas mixture into an outlet stripping gas flow and an outlet fuel flow and provide the outlet stripping gas flow to the stripping gas outlet and the outlet fuel flow to the fuel outlet.

10. The fuel oxygen reduction unit of any preceding clause, wherein the outlet fuel flow has a lower oxygen content than the inlet fuel flow, and wherein the outlet stripping gas flow has a higher oxygen content than the inlet stripping gas flow.

11. The fuel oxygen reduction unit of any preceding clause, further comprising a catalyst disposed downstream of the separator, wherein the catalyst receives and treats the outlet stripping gas flow, and wherein an inlet stripping gas flow exits the catalyst.

12. The fuel oxygen reduction unit of any preceding clause, wherein the fuel source comprises a hydrogen fuel.

13. A method for operating a fuel delivery system for an engine comprising: receiving an inlet fuel flow in a contactor of a fuel oxygen reduction unit for reducing an amount of oxygen in the inlet fuel flow using a stripping gas flow through a stripping gas flowpath; separating a fuel/gas mixture into an outlet stripping gas flow and an outlet fuel flow via a separator; and controlling a level of the fuel/gas mixture inside the separator by regulating the inlet fuel flow to the contactor.

14. The method of any preceding clause, wherein separating the fuel/gas mixture comprises using the separator that receives the fuel/gas mixture from the contactor.

15. The method of any preceding clause, wherein controlling the amount of the inlet fuel flow comprises using a level control device that includes a spool and a spring.

16. The method of any preceding clause, wherein controlling the level of the fuel/gas mixture inside the separator by regulating the inlet fuel flow to the contactor comprises, with a separator edge pressure increasing, the spool being moved to compress the spring and close a portion of a control device fuel outlet thereby reducing the amount of the inlet fuel flow to the contactor.

17. The method of any preceding clause, wherein controlling the level of the fuel/gas mixture inside the separator by regulating the inlet fuel flow to the contactor comprises, with the separator edge pressure decreasing, the spring exerting a force on the spool and the spool is moved to open a portion of the control device fuel outlet thereby increasing the amount of the inlet fuel flow to the contactor.

18. The method of any preceding clause, wherein an increase in the fuel/gas mixture received by the separator increases the separator edge pressure.

19. The method of any preceding clause, wherein a decrease in the fuel/gas mixture received by the separator decreases the separator edge pressure.

20. A leveling system for a fuel oxygen reduction unit having a contactor including a fuel inlet that receives an inlet fuel flow and a stripping gas inlet that receives an inlet stripping gas flow, and a separator that receives a fuel/gas mixture from the contactor, the leveling system comprising: a level control device configured to be positioned in fluid communication with a fuel flowpath to the contactor, the level control device comprising a spool movably disposed within the level control device configured to control a level of the fuel/gas mixture inside the separator by regulating the inlet fuel flow to the contactor.

The method of any preceding clause, wherein the outlet fuel flow has a lower oxygen content than the inlet fuel flow, and wherein the outlet stripping gas flow has a higher oxygen content than an inlet stripping gas flow.

This written description uses examples to disclose aspects of the disclosure, including the best mode, and also to enable any person skilled in the art to practice the aspects of the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A fuel oxygen reduction unit for an engine comprising:
a contactor including a fuel inlet that receives an inlet fuel flow and a stripping gas inlet that receives an inlet stripping gas flow, the contactor configured to form a fuel/gas mixture;
a separator that receives the fuel/gas mixture, the fuel oxygen reduction unit defining a circulation gas flowpath from the separator to the contactor; and
a level control device comprising a control device fuel inlet in communication with a fuel source, a control device fuel outlet in communication with the fuel inlet of the contactor, a spool movably disposed within the level control device and having a first spool end and a second spool end, a fuel/gas mixture pressure reference portion in communication with a fuel/gas mixture pressure and the first spool end, a separator edge pressure reference portion in communication with a separator edge pressure and the second spool end, and a spring in communication with the first spool end, wherein the level control device controls an amount of the fuel/gas mixture inside the separator by regulating the inlet fuel flow to the contactor.

2. The fuel oxygen reduction unit of claim 1, wherein the level control device is upstream of the contactor and controls an amount of the inlet fuel flow to the contactor.

3. The fuel oxygen reduction unit of claim 1, wherein with the separator edge pressure increasing, the spool is moved to compress the spring and close a portion of the control device fuel outlet thereby reducing the amount of the inlet fuel flow to the contactor.

4. The fuel oxygen reduction unit of claim 3, wherein with the separator edge pressure decreasing, the spring exerts a force on the spool and the spool is moved to open a portion of the control device fuel outlet thereby increasing the amount of the inlet fuel flow to the contactor.

5. The fuel oxygen reduction unit of claim 4, wherein an increase in the fuel/gas mixture received by the separator increases the separator edge pressure.

6. The fuel oxygen reduction unit of claim 5, wherein a decrease in the amount of the fuel/gas mixture received by the separator decreases the separator edge pressure.

7. The fuel oxygen reduction unit of claim 1, wherein the separator includes an inlet in fluid communication with the contactor that receives the fuel/gas mixture, a fuel outlet, and a stripping gas outlet, wherein the separator is configured to separate the fuel/gas mixture into an outlet stripping gas flow and an outlet fuel flow and provide the outlet stripping gas flow to the stripping gas outlet and the outlet fuel flow to the fuel outlet.

8. The fuel oxygen reduction unit of claim 7, wherein the outlet fuel flow has a lower oxygen content than the inlet fuel flow, and wherein the outlet stripping gas flow has a higher oxygen content than the inlet stripping gas flow.

9. The fuel oxygen reduction unit of claim 8, further comprising:
a catalyst disposed downstream of the separator, wherein the catalyst receives and treats the outlet stripping gas flow, and wherein an inlet stripping gas flow exits the catalyst.

10. The fuel oxygen reduction unit of claim 1, wherein the fuel source comprises a hydrogen fuel.

11. A leveling system for a fuel oxygen reduction unit, wherein the fuel oxygen reduction unit comprises a contactor including a fuel inlet that receives an inlet fuel flow and a stripping gas inlet that receives an inlet stripping gas flow, and a separator that receives a fuel/gas mixture from the contactor, the leveling system comprising:
a level control device comprising a control device fuel inlet in communication with a fuel source, a control device fuel outlet in communication with the fuel inlet of the contactor, a spool movably disposed within the level control device and having a first spool end and a second spool end, a fuel/gas mixture pressure reference portion in communication with a fuel/gas mixture and the first spool end, a separator edge pressure reference portion in communication with a separator edge pressure and the second spool end, and a spring in communication with the first spool end wherein the level control device controls an amount of fuel/gas mixture inside the separator by regulating the inlet fuel flow to the contractor, wherein the fuel source comprises a hydrogen fuel.

12. A method for operating a fuel delivery system for an engine by using the fuel oxygen reduction unit for an engine recited in claim 1 comprising:
receiving an inlet fuel flow in a contactor of a fuel oxygen reduction unit for reducing an amount of oxygen in the inlet fuel flow using a stripping gas flow through a stripping gas flowpath;
separating a fuel/gas mixture into an outlet stripping gas flow and an outlet fuel flow via a separator; and
controlling a level of the fuel/gas mixture inside the separator by regulating the inlet fuel flow to the contactor.

13. The method of claim 12, wherein the separating the fuel/gas mixture comprises using the separator that receives the fuel/gas mixture from the contactor.

14. The method of claim 13, wherein controlling the amount of the fuel/gas mixture inside the separator by regulating the inlet fuel flow to the contactor comprises using a level control device that includes a spool and a spring.

15. The method of claim 14, wherein the controlling the amount of the fuel/gas mixture inside the separator by regulating the inlet fuel flow to the contactor comprises, with a separator edge pressure increasing, the spool being moved to compress the spring and close a portion of a control device fuel outlet thereby reducing the amount of the inlet fuel flow to the contactor.

16. The method of claim 15, wherein the controlling the amount of the fuel/gas mixture inside the separator by regulating the inlet fuel flow to the contactor comprises, with the separator edge pressure decreasing, the spring exerting a force on the spool and the spool is moved to open a portion of the control device fuel outlet thereby increasing the amount of the inlet fuel flow to the contactor.

17. The method of claim 16, wherein an increase in the fuel/gas mixture received by the separator increases the separator edge pressure.

18. The method of claim 17, wherein a decrease in the fuel/gas mixture received by the separator decreases the separator edge pressure.

* * * * *